2,871,830

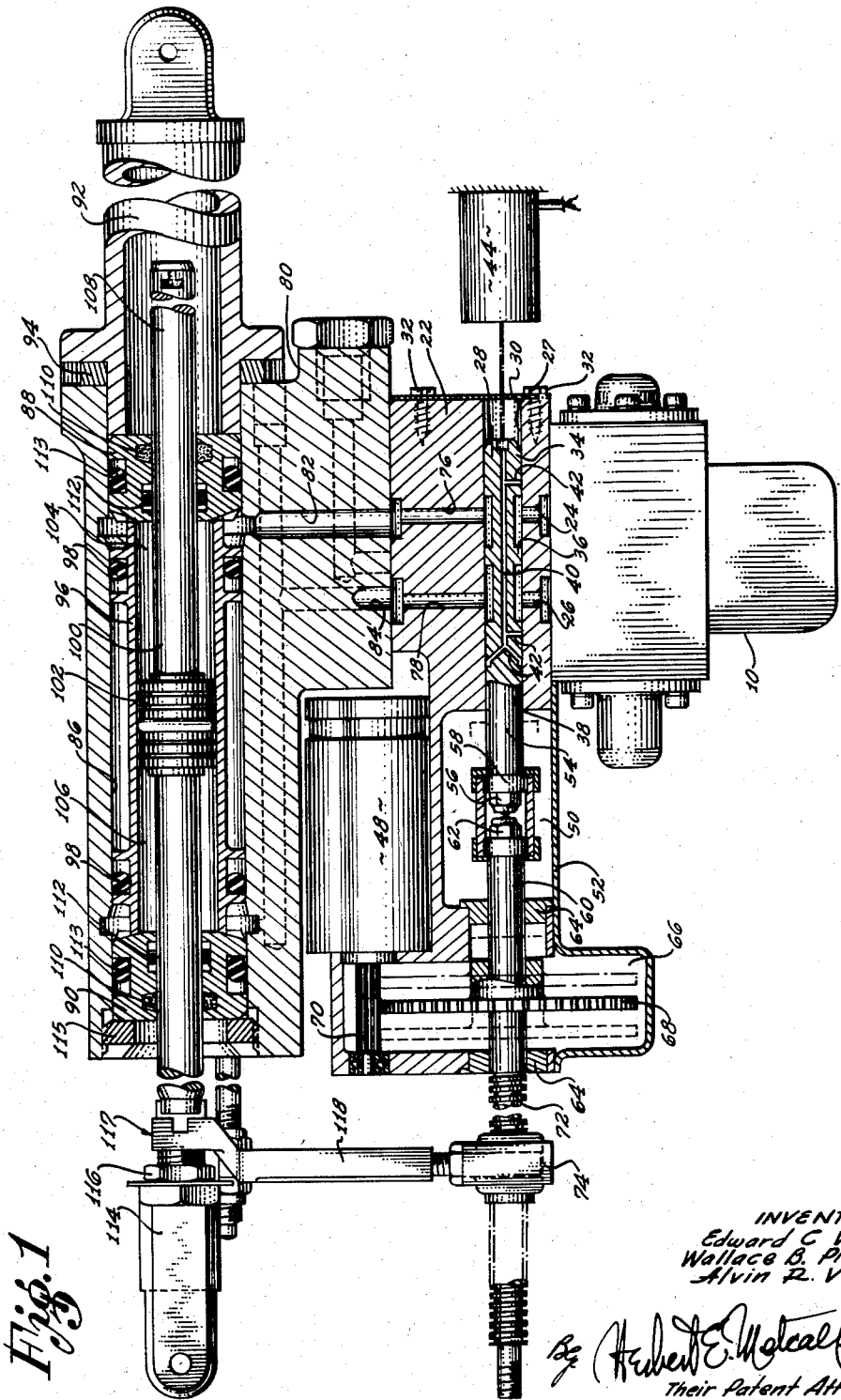

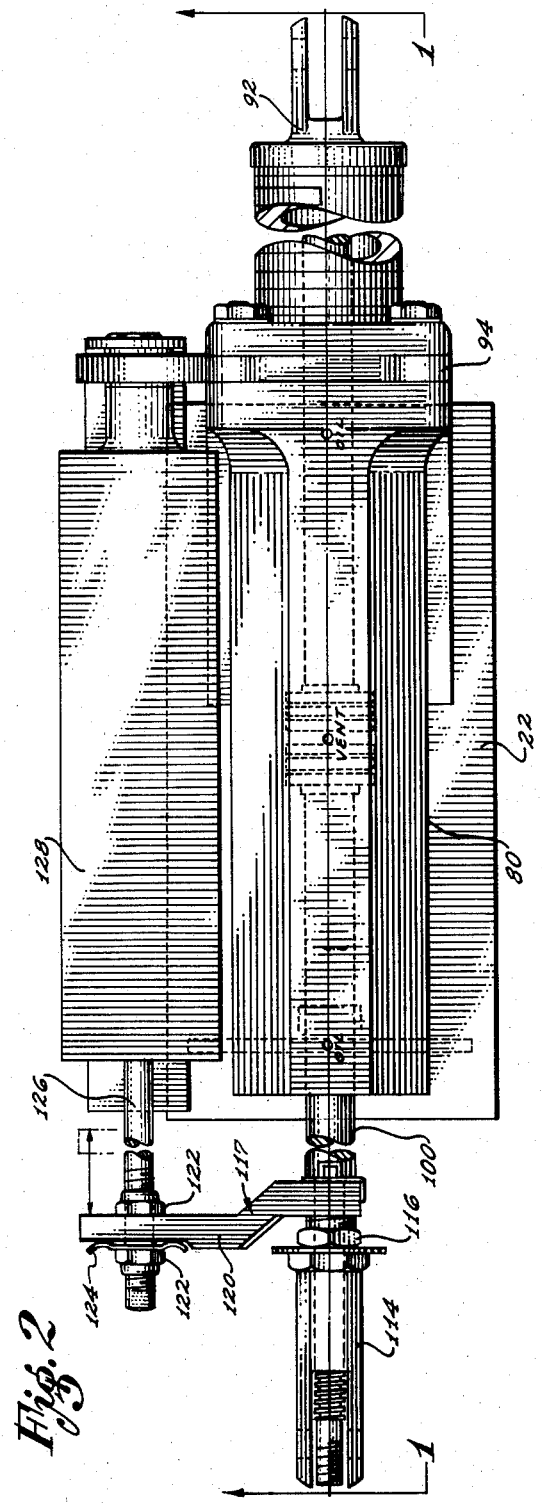

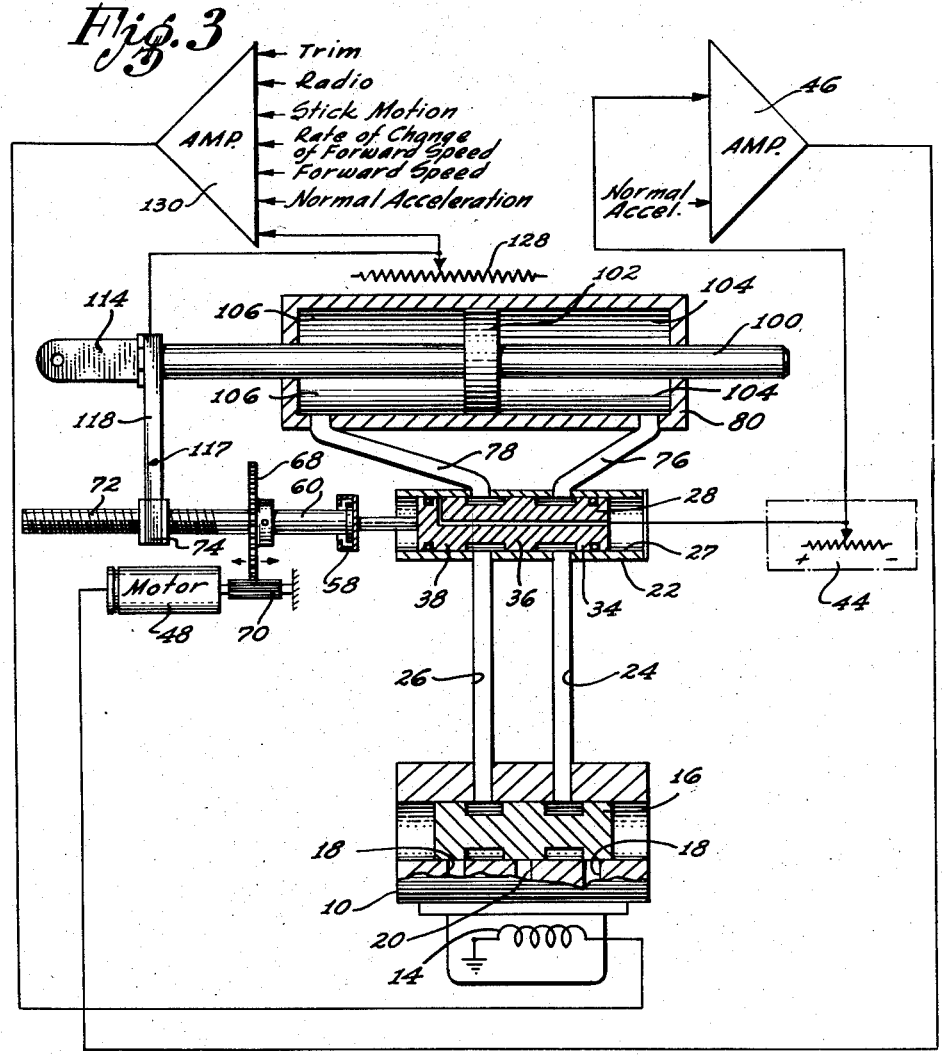

VARIABLE AUTHORITY SERVO

Edward C. Wirth, Los Angeles, Wallace B. Pierce, Burbank, and Alvin R. Vogel, Los Angeles, Calif., assignors to Northrop Aircraft, Inc., Hawthorne, Calif., a corporation of California Application May 4, 1956, Serial No. 582,702

7 Claims. (Cl. 121—41)

This invention has to do with hydraulics and/or pneumatics and more particularly with a hydraulic and/or pneumatic variable authority servo system.

The speed and distance moved by an aircraft automatic flight control series servo actuator for use in contemporary flight control systems can be divided into two broad categories. These are: high speed with small excursions of the servo system for performing augmentation and improving the desired end result; low speed with large excursions of the servo system for performing automatic approach, automatic pull-outs, manual and automatic trim.

A system has been developed which takes advantage of the fact that the high speed displacement required is of small amplitude and low speed displacement required is of large amplitude. This system may be applied to any flight control axis of the aircraft.

Therefore, an object of this invention is to provide a variable authority servo-actuator that will perform small excursions of servo movement at high speeds of the servo and at low speeds will perform large excursions.

Another object of this invention is to provide hydraulically, pneumatically or electrically actuated valves that monitor fluid to each of the other valves in such a manner as to enable there to be small excursions of movement of certain valves at high speeds and large excursions at low speeds.

A yet further object of this invention is to provide a variable authority servo valve system having a group of hydraulically, pneumatically or electrically actuated valves that are interconnected by a novel arrangement of structure in order that a desired operation of an aircraft may be obtained.

A still further object of this invention is to provide a variable authority servo that is readily and economically fabricated, easily and maintained and operationally sound.

Broadly, the invention is directed to a plurality of interconnected valves that may be actuated by any one or more methods. One of the valves is interconnected to the control stick of the aircraft and to a flight control surface. The other valves of the system are connected to various automatic controlling instruments and are energized by the later in order that the first mentioned valve will have monitored signals imposed thereon. The result of the arrangement being that the control surfaces of the aircraft will make small high speed excursions or low speed large excursions.

Figure 1 is a fragmentary, cross-sectional view, taken on lines 1—1 of Figure 1, illustrating and having embodied therein the present invention.

Figure 2 is a fragmentary, perspective view illustrating the present invention wherein the structure of Figure 1 is rotated 90°.

Figure 3 is a generally schematic illustration showing the present invention associated with structure that influences its operation.

Referring to the drawings for a more detailed description of the present invention 10 designates an electro-hydraulic valve having an energizing coil 14, Figure 3, and a hydraulic fluid actuated slide 16 therein. The hydraulic system of the aircraft is connected to valve 10 and enters into the valve through ports or conduits 18 and discharges through a port or conduit 20. The ports will switch function in the event the potential on the coil is changed.

Valve 10 is mounted on and is in communication with housing 22 by entrance and discharge ports or conduits 24 and 26. Housing 22 has a cylindrical bore 27 therethrough that receives an elongated spool 28. One end of the bore 27 is covered by a plate 30 and secured in place by screws 32. The spool 28 has a plurality of lands 34, 36, and 38 that, at certain times, are superimposed over ports 24 and 26 and restrict or stop the flow of fluid from valve 10. A bore 40 is provided through a portion of the center of the spool 28 and at one end of the bore is provided a plurality of branch ports 42. Connected to one end of the spool 28, by any conventional means, and actuated thereby is a spool centering potentiometer 44. The potentiometer through an amplifier 46 is connected to a motor 48. A variation of the current or the potential of potentiometer 44 will result in altering the speed or direction of rotation of the motor 48. This latter is accomplished by feeding the signal through the amplifier 46.

The housing 22 has a chamber 50 therein that is enclosed by a cover 52. One end 54 of the spool 28 extends into the chamber 50. Attached to end 54 by a nut 56 is a fitting or coupling 58. The coupling 58 is also attached to a screw jack 60 and retained thereon by a nut 62. The screw jack 60 is, as will be set forth, required to rotate, but the coupling 58 is of such a nature that the rotation of the screw jack 60 is not transmitted to the spool 28.

The screw jack 60 extends through and is supported by a pair of spaced apart bearings 64 mounted in the housing 22.

The housing 22 and cover 52 provide another chamber 66. Located in chamber 66, between bearings 64 and on screw jack 60 is a gear 68 that meshes with a drive gear 70. The motor 48 when energized by the potentiometer 44 and amplifier 46 causes the drive gear 70 to rotate.

That end of the screw jack 60 in opposed relationship to the coupling 58 has a worm 72 thereon. Threaded on the worm 72 is a screw nut 74. When the screw jack 60 is caused to rotate the relative position of the screw nut is not disturbed. In other words the screw nut 74 retains its position and the screw jack 60 rotates into and out of the screw nut.

The spool housing 22 has an additional pair of ports 76 and 78 that are in communication with the bore 27. Spool housing 22 is mounted on a body 80 and the ports 76 and 78 are in communication with ports 82 and 84 provided in the body.

A cylindrical bore 86 extends through the body, Figure 1, and a packing gland 88 and 90 is located in each end of the bore 86. Securely pressed into the bore 86 on the exterior side of gland 88 is a bifurcated, hollow fitting 92. The control stick of the aircraft, not shown, is interconnected to the fitting 92. Through the fitting the pilots input is imposed on the variable authority servo.

A support 94 is positioned between fitting 92 and body 80.

Pressed into the cylindrical bore 86 is a cylinder 96. Port 82 is in communication with one end of the cylinder 96 and port 84 is in communication with the other end. In order to prevent leakage of hydraulic fluid about the ends of the cylinder 96, the latter is provided with O rings 98.

Extending through the cylinder 96, packing glands 88 and 90 is a rod 100 having a piston 102 intermediate the ends thereof. The piston 102 effectively divides the cylinder into two chambers 104 and 106. One end 108, of the rod 100 extends into the fitting 92.

Each packing gland 88 and 90 is provided with a lubricant impregnated felt disc 110 and an O ring 112 for sealing the chambers 104 and 106. Further, each packing gland 88 and 90 is provided with an O ring 113 that provides an additional seal against hydraulic fluid leaking past the ends of the cylinder 96. Threaded into body 80 and bearing against packing gland 90, to retain the latter in place is a locking ring 115.

That end of the rod 100 adjacent packing gland 90 is threaded to receive a bifurcated fitting 114. Nut 16 properly retains fitting 114 in the desired position. The rod 100 is interconnected to the control axis of the aircraft through the medium of fitting 114.

Securely fixed to the threaded end of the rod 100 is an L-shaped link 117. One leg 118 of the link has threaded thereinto the screw nut 74. The other leg 120 is secured, by nuts 122 and a spring 124, to the rod 126 of a potentiometer 128. The potentiometer is in turn attached to the body 80 by means of support 94, Figure 2.

It may be determined by referring to the last mentioned figure that the body 80 has oil and vent holes therein.

Attention is directed to the schematic illustration of the invention portrayed in Figure 3.

The potentiometer 44 is influenced by the spool 28. The current on the potential is altered. The effect of this influence is transmitted to the motor 48 through amplifier 46. The motor 48 is further influenced by a signal that may be imposed thereon through the amplifier 46 by a normal accelerometer. In other words, as the speed of the aircraft is altered the normal accelerometer provides a signal, through amplifier 46, which will alter the speed and/or direction of rotation of motor 48. Altering the operation of the motor through a signal imposed by the normal accelerometer results in movement of spool 28. This alters the position of potentiometer 44 and its signal. The result is that a cycle of operation develops to provide the proper signal for centering the spool 28.

The potentiometer 128 is influenced by the piston 102 and rod 100 to alter the current or potential and this influence, through an amplifier 130 is transmitted to the electro-hydraulic valve 10. The operation of the valve 10 is further influenced by a normal accelerometer, the forward speed of the aircraft, rate of change of the forward speed, control stick motion, control axis trim, and radio signals all of which will impose a signal to vary the current or potential that is applied to the energizing coil 14. There are various conventional instruments such as Mach sensors that control the operation of the last mentioned influencing factors.

The operation of the invention is as follows:

Assume the system to be filled with hydraulic fluid and that the aircraft is flying in straight and level flight and the intention of the pilot is to retain the condition.

There are outside factors that influence and affect this condition such as air flow. Air flow changes tend to affect the control axis of the aircraft. As a result of these changes certain Mach sensors and servo mechanisms are affected which transmit their signals to valve 10. For instance, any one of the elements or functions associated with amplifier 130 may be caused to transmit a signal. The signal may be composed of a specific current and/or potential. This signal is in turn sent to the valve 10 and energizing coil 14. The magnitude and potential of the signal will cause a specific movement of slide 16. As a result the slide 16 is caused to constantly hunt in both directions of travel in order to maintain the level condition of the aircraft. The result of the hunting is that the pressure and flow of hydraulic fluid to piston 102 is in a constant changing state all of which tends to alter the position of the control surface and maintain same in a position necessary to maintain straight and level flight.

The piston rod 100 being in constant movement transmits the same to link 117, nut 74 and worm 72, screw jack 60, coupling 58, to impose limited movement on spool 28. Movement of the spool 28 bring land 34 into a position to close inlet port 24. Land 36 is also approaching the position to close discharge port 26. As a result of the movement of the spool 28 the potentiometer 44 has its position altered. The feedback signal of potentiometer 44 is fed through the amplifier 46 to the motor 48. Energization of the motor rotates gears 70 and 68 and worm 72 in the nut moving screw jack 60 in a direction to recenter the spool 28. This recentering of spool 28 cancels the potentiometer signal to stop the motor 48. Thus the feedback signal of the potentiometer is always of the type to center the spool 28, unless the signal is unbalanced by the signal from the normal accelerometer, through amplifier 46, to the motor 48.

The purpose of the recentering action of spool 28 is to prevent the latter from interfering with normal operation of amplifier circuit 130, valve 10 and piston 102. Further, the piston is maintained in a position at all times to prevent large magnitude high speed movement of the piston 102 caused by failure of the amplifier circuit 130 and valve 10, thus safeguarding the aircraft structure. Low speed movements of the piston 102 can be handled readily by a competent pilot.

Reference was made to an unbalanced signal that may be imposed on the amplifier 46 by the normal accelerometer associated therewith. As an illustration of this unbalanced signal that may occur a pilot's pull-up maneuver will be explained.

Assume the pilot imposes a motion on the control stick which is transmitted to the fitting 92. The entire unit or variable authority servo will be caused to move in the pilot input direction. For the purpose of following a complete operation, assume the control axis to be the elevators of the aircraft and that the pilot input results in an up elevator attitude. As a result, the aircraft starts a "pull-up" maneuver. Certain changes occur in the positions of the spool 28, piston, and rod 102 and 100 respectively, slide 16 and related structure.

Also assume ports or conduits 18, 24, 76 and 82 to be the inlet ports and ports or conduits 20, 26, 78 and 84 to be the discharge ports.

The pull-up maneuver results in a change in the output signal of the normal accelerometer associated with amplifier 46. This change is imposed on amplifier 46 which transmits the signal to the motor 48. The motor is energized to rotate drive gear 70, gear 68, and the screw jack 60. Rotation of the screw jack 60, which is coupled to the spool 28 causes the spool to turn, as viewed in Figure 1. Movement of the spool 28 to the left again brings land 34 into a position to close inlet port 24. Land 36 is also again approaching the position to close discharge port 26. As a result of the movement of the spool 28 the potentiometer 44 is influenced. The feedback signal of potentiometer 44 now cancels the normal accelerometer signal fed into amplifier 46 stopping the motor 48 and spool 28 in off center or unbalanced condition. The normal accelerometer will further unbalance the spool 28 if the pull-up maneuver is increased or if increased "g" is applied to the aircraft. At the threshold of maximum "g" any further movement of the hydraulic piston 102 in a direction to move the control surface to increase "g" will immediately cause spool 28 to shut off the fluid supply to the side of the piston 102 as required to stop the piston movement. The obvious function of the above structure is to operate as a safety feature in the event of failure of the circuit associated with amplifier 130, valve 10 and piston 102.

Assume that for some reason, dictated by outside influences such as slide valve leakage, the spool 28 overtravels either to the right or left as viewed in Figure 2. The overtravel is such that the ports 42 are in communication with either 24 or 26. The effect of this condition is that hydraulic fluid will flow through the bore in spool 28 to the end of bore 27 adjacent plate 30 which is in communication with the fluid return. The spool 28 as a result does not have an excessive force imposed thereon that cannot be overcome.

This referred to force for purposes of explanation may be caused by leakage. Assume that leakage occurs from port 24. The fluid flows past spool 28 into port 76 and ultimately a fluid force is imposed on piston 102. The force is transmitted to the link 117, screw jack 60 and back to the spool 28 which causes the spool to move. In the absence of ports 42 this transmitted force may be of such a magnitude as to resist movement transmitted by a fluid from valve 10 to the motor 48. Therefore the ports 42 are provided to carry off this leakage.

It may be seen that many factors influence the operation of the variable authority servo, and that many variations of the operation of the invention may be conceived, but it is believed that each described element has been sufficiently explored to define the operation.

The operation of the invention as disclosed is believed to fulfill the stated objects.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A variable authority servo comprising: a fluid actuated piston and rod enclosed within a cylinder; a housing in communication with said cylinder by fluid carrying conduits; a reciprocable spool within said housng that monitors the flow of fluid to said cylinder; a valve in communication with said housing, by conduits, that controls the flow of fluid to said housing; mechanical means interconnecting said spool and rod; structure operatively interconnected to said spool that actuates it to position it with respect to said conduits and monitor the flow of fluid to said cylinder; and equipment operatively interconnected to said rod and valve and actuated by the former to alter the position of the valve.

2. A variable authority servo comprising: a fluid actuated piston and rod enclosed within a cylinder; a housing in communication with said cylinder by fluid carrying conduits; a reciprocable spool within said housing that monitors the flow of fluid to said cylinder; a valve in communication with said housing, by conduits, that controls the flow of fluid to said housing; mechanical means interconnecting said spool and rod; structure operatively interconnected to said spool that actuates it to position it with respect to said conduits; said structure including a motor; and equipment operatively interconnected to said rod and valve and actuated by the former to alter the position of the valve.

3. A variable authority servo comprising: a fluid actuated piston and rod enclosed within a cylinder; a housing in communication with said cylinder by fluid carrying conduits; a reciprocable spool within said housing that monitors the flow of fluid to said cylinder; a valve in communication with said housing, by conduits, that controls the flow of fluid to said housing; mechanical means interconnecting said spool and rod; and equipment operatively interconnected to said rod and valve and actuated by the former to alter the position of the valve.

4. A variable authority servo comprising: a fluid actuated piston and rod enclosed within a cylinder; a housing in communication with said cylinder by fluid carrying conduits; a reciprocable spool within said housing that monitors the flow of fluid to said cylinder; a valve in communication with said housing, by conduits, that controls the flow of fluid to said housing; mechanical means interconnecting said spool and rod; structure operatively interconnected to said spool that actuates it to position it with respect to said conduits; said structure including a motor; and means operatively interconnected to said spool and motor and actuated by the former to energize the latter which in turn tends to alter the position of the former.

5. A variable authority servo comprising: a fluid actuated piston and rod enclosed within a cylinder; a housing in communication with said cylinder by fluid carrying conduits; a reciprocable spool within said housing that monitors the flow of fluid to said cylinder; a valve in communication with said housing, by conduits, that controls the flow of fluid to said housing; mechanical means interconnecting said spool and rod; structure operatively interconnected to said spool that actuates it to position it with respect to said conduits; means operatively interconnected to said spool and structure and actuated by the former to energize the latter which in turn tends to alter the position of the former; and equipment operatively interconnected to said rod and said valve and actuated by the former to alter the position of the latter.

6. A variable authority servo comprising: a fluid actuated piston and rod enclosed within a cylinder; a housing in communication with said cylinder by fluid carrying conduits; a reciprocable spool within said housing that monitors the flow of fluid to said cylinder; a valve in communication with said housing, by conduits, that controls the flow of fluid to said housing; mechanical means interconnecting said spool and rod; structure operatively interconnected to said spool that actuates it to position it with respect to said conduits; said structure including a motor to alter the position of the spool with respect to said conduits; and equipment operatively interconnected to said rod and valve and actuated by the former to alter the position of the latter; and means operatively interconnected to said spool and motor and actuated by the former to energize the latter to alter the position of the former.

7. A variable authority servo comprising: a fluid actuated piston and rod enclosed within a cylinder; a housing on and in communication, by fluid carrying ports, with said cylinder; a reciprocable spool within said housing that monitors the flow of fluid to said cylinder; fluid lands on said spool; a valve on and in communication, by ports, with said housing, that controls the flow of fluid to said housing; a link interconnecting said spool and rod; a first potentiometer actuated motor unit operatively interconnected to said spool, through gearing, and rod, through said link, that actuates each to position each with respect to said ports; and a second potentiometer system operatively interconnected to said rod and valve and actuated by the former to alter the position of the latter.

References Cited in the file of this patent
UNITED STATES PATENTS

| 1,231,628 | Lear | July 3, 1917 |
| 1,500,685 | Roberts | July 8, 1924 |
| 1,719,875 | Cooper | July 9, 1929 |
| 2,016,727 | Roth | Oct. 8, 1935 |
| 2,366,382 | Burton et al. | Jan. 2, 1945 |
| 2,652,812 | Fenzl | Sept. 22, 1953 |
| 2,738,772 | Richter | Mar. 20, 1956 |